(12) United States Patent
Friesen et al.

(10) Patent No.: US 12,304,440 B2
(45) Date of Patent: May 20, 2025

(54) BRAKE REGULATING DEVICE, BRAKING METHOD, AND BRAKE SYSTEM FOR A RAIL VEHICLE

(71) Applicant: KNORR-BREMSE SYSTEME FÜR SCHIENENFAHRZEUGE GMBH, Munich (DE)

(72) Inventors: Ulf Friesen, Neubiberg (DE); Marc-Gregory Elstorpff, Munich (DE); Rupert Lang, Schmidmühlen (DE); Ralf Furtwängler, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 347 days.

(21) Appl. No.: 17/601,034

(22) PCT Filed: Feb. 28, 2020

(86) PCT No.: PCT/EP2020/055318
§ 371 (c)(1),
(2) Date: Oct. 1, 2021

(87) PCT Pub. No.: WO2020/200598
PCT Pub. Date: Oct. 8, 2020

(65) Prior Publication Data
US 2022/0169223 A1  Jun. 2, 2022

(30) Foreign Application Priority Data
Apr. 1, 2019 (DE) .................... 10 2019 108 447.4

(51) Int. Cl.
*B60T 13/66* (2006.01)
*B60T 8/17* (2006.01)
*B60T 17/22* (2006.01)

(52) U.S. Cl.
CPC .......... *B60T 13/665* (2013.01); *B60T 8/1705* (2013.01); *B60T 17/228* (2013.01); *B60Y 2200/30* (2013.01); *B60Y 2400/81* (2013.01)

(58) Field of Classification Search
CPC .... B60T 13/665; B60T 8/1705; B60T 17/228; B60Y 2200/30; B60Y 2400/81
See application file for complete search history.

(56) References Cited

U.S. PATENT DOCUMENTS

| | | | |
|---|---|---|---|
| 6,314,358 B1 | 11/2001 | Dorn et al. | |
| 7,533,943 B2 * | 5/2009 | Kahrs | B60T 17/228 |
| | | | 188/181 A |

(Continued)

FOREIGN PATENT DOCUMENTS

| | | |
|---|---|---|
| CN | 1659057 A | 8/2005 |
| CN | 107406064 A | 11/2017 |

(Continued)

OTHER PUBLICATIONS

International Search Report and Written Opinion Corresponding to PCT/EP2020/055318 dated Jul. 2, 2020.

(Continued)

*Primary Examiner* — Vishal R Sahni
(74) *Attorney, Agent, or Firm* — Barnes & Thornburg LLP

(57) ABSTRACT

A brake system, brake regulating method and device for a rail vehicle use an input for a target deceleration value ($ä_{set}$), an input for an actual deceleration value ($a_{train}$), and an output for a deceleration control variable value. The deceleration control variable value ($a_{OUT}$) is set by a regulating unit to minimize a deviation between the actual deceleration value ($a_{train}$) and the target deceleration value ($a_{set}$). The brake regulating device uses a limiting device, which limits the deceleration control variable value ($a_{out}$) independently of the regulating unit such that the deceleration control (Continued)

variable value ($a_{out}$) deviates from the target deceleration value ($a_{set}$) maximally by a maximum negative control stroke to lower values or maximally by a maximum positive control stroke to higher values. The invention additionally relates to a braking method and a brake system for a rail vehicle.

14 Claims, 3 Drawing Sheets

(56) References Cited

U.S. PATENT DOCUMENTS

| | | | |
|---|---|---|---|
| 10,583,744 B2* | 3/2020 | Müller | B60T 8/1705 |
| 2007/0244606 A1 | 10/2007 | Zhang et al. | |
| 2013/0338860 A1 | 12/2013 | Herden et al. | |
| 2018/0194233 A1* | 7/2018 | Müller | B60L 7/18 |
| 2019/0202484 A1* | 7/2019 | Yamamoto | B61L 25/025 |
| 2020/0070790 A1* | 3/2020 | Staats | B60T 8/58 |
| 2020/0262400 A1* | 8/2020 | Tomberger | B60T 13/665 |

FOREIGN PATENT DOCUMENTS

| | | |
|---|---|---|
| CN | 109484427 A | 3/2019 |
| DE | 19804570 A1 | 8/1999 |
| DE | 102007017034 A1 | 11/2007 |
| DE | 102010053683 A1 | 6/2012 |
| DE | 102011052545 B4 | 4/2013 |
| DE | 102015110053 A1 | 12/2016 |
| EP | 3056397 A1 | 8/2016 |
| EP | 2741944 B1 | 10/2017 |
| JP | H11189146 A | 7/1999 |
| JP | 2001327003 A | 11/2001 |
| JP | 2001347938 A | 12/2001 |
| JP | 2005528069 A | 9/2005 |
| WO | 03086809 A1 | 10/2003 |

OTHER PUBLICATIONS

BSI Standards Publication—Railway applications "Requirements for the brake system of trains hauled by locomotives"; EN 14198:2016, published Mar. 2017.

* cited by examiner

Prior art

BRAKE REGULATING DEVICE, BRAKING METHOD, AND BRAKE SYSTEM FOR A RAIL VEHICLE

CROSS REFERENCE AND PRIORITY CLAIM

This patent application is a U.S. National Phase of International Patent Application No. PCT/EP2020/055318 filed Feb. 28, 2020, which claims priority to German Patent Application No. 10 2019 108 447.4, the disclosure of which being incorporated herein by reference in their entireties.

FIELD

The disclosed embodiments relate to a brake regulating device for a rail vehicle, which has an input for a target deceleration value and an input for an actual deceleration value, as well as an output for a deceleration manipulated variable value. In the case of the brake regulating device, the manipulated variable value is set by a control unit to minimize a deviation between the actual deceleration value and the target deceleration value.

The disclosed embodiments furthermore relate to a brake system for a rail vehicle having such a brake regulating device and to an operating method for a brake system and include systems that use, in addition to regenerative brakes and auxiliary brakes, such as eddy-current brakes, brake systems for rail vehicles have friction brakes, for example disk brakes or shoe brakes.

BACKGROUND

Environmental influences such as, in particular, wetness, snow or ice reduce a coefficient of friction of the friction partners of these brakes, that is to say, for example, the coefficient of friction between the brake pad and the brake disk. to achieve a predictable braking result in spite of variable friction coefficients, use is made of control circuits which compare a demanded and expected deceleration of the rail vehicle with an actually achieved deceleration and readjust a manipulated variable of the brake system, for example a braking force.

A brake system with a regulating device of this kind is known from DE 10 2015 110 053 A1, for example. In this system, acceleration components of the rail vehicle are determined, wherein as a special feature, in addition to a longitudinal deceleration, a vertically acting deceleration is also determined to be able to separately take into account an effect of a downhill slope force. DE 10 2011 052 545 B4 likewise describes a brake system with a brake regulating device, in which actual deceleration values are measured redundantly and averaged to achieve increased reliability for the correct functioning of the brake system.

SUMMARY

Disclosed embodiments provide a brake regulating device, a brake system and an operating method for a brake system which lead to optimum braking results even in the case of changed friction properties between the friction partners of the brake system, in particular as a result of wetness, snow or ice.

BRIEF DESCRIPTION OF FIGURES

The disclosed embodiments is explained in greater detail below by means of exemplary embodiments with the aid of Figs. The Figs. show the following.

DETAILED DESCRIPTION

Figure 5:
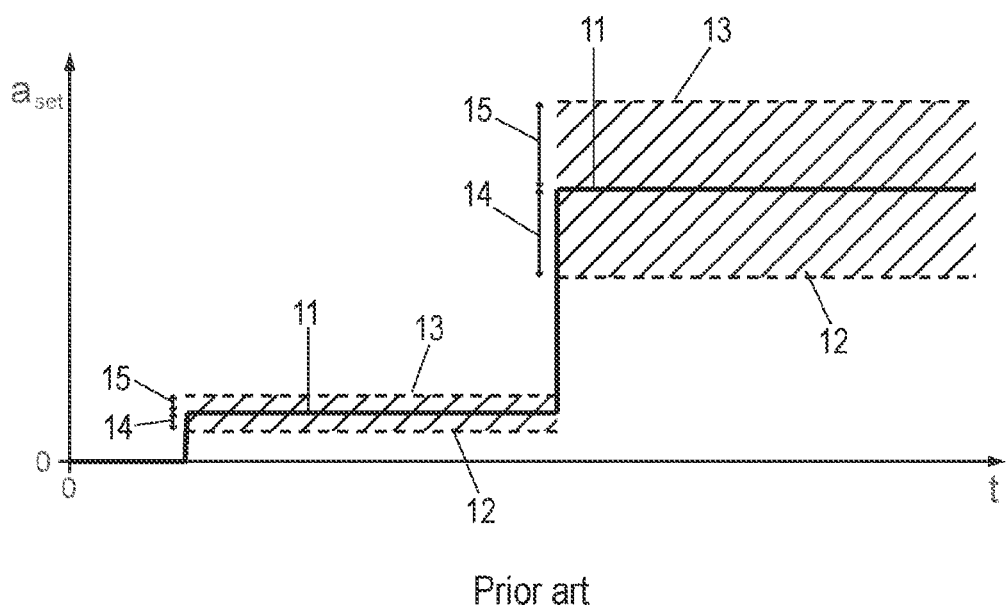
FIG. 5 shows a diagram intended to illustrate the behavior of a brake system according to the prior art.

FIG. 5 shows the behavior of a controlled system of a control circuit for such a regulated brake system according to the prior art. In the diagram, a progressive time t is reproduced on the horizontal axis and a predetermined target value, here a predetermined target acceleration value aset, is reproduced on the vertical axis. A demand on the brake system with regard to the deceleration aset to be assumed is reproduced as a function of time in a curve 11. The curve 11 rises in two steps from an initial value aset=0 via an intermediate value to a demanded maximum value of the deceleration to be achieved. Thus, a braking situation is reproduced in which slight braking is to be carried out for a certain time and then stronger braking is to be carried out.

A lower control limit 12 and an upper control limit 13 are shown around the curve 11. These two limits 12, 13 indicate a control range within which a brake regulating device according to the prior art can modify the demanded deceleration to come as close as possible to the demanded deceleration according to the curve 11 with an actually measured deceleration. The situation illustrated results from the control behavior of a control unit of the control circuit, which is here constructed as a proportional controller, for example. A maximum positive control excursion 14 and a maximum negative control excursion 15, respectively, which are indicated by arrows in FIG. 4, correspond to the control limits 12, 13. According to the prior art, the situation obtained with the proportional controller is that the maximum positive control excursion 14 and the maximum negative control excursion 15 for a demanded deceleration value are equal and correspond to a specific predetermined percentage of the currently demanded deceleration value.

In reality, however, particularly under the environmental conditions mentioned at the outset, such as wetness, snow or ice, effects occur between the friction partners which can be compensated only inadequately by the control circuit described. For example, the environmental influences mentioned have a stronger effect in the case of lower braking requirements than in the case of higher braking requirements. One reason is, for example, that moisture evaporates during heavier braking owing to the heating of the friction partners (energy input) and the detrimental effect decreases during braking (effect of "braking dry").

Disclosed embodiments provide a brake regulating device, a brake system and an operating method for a brake system which lead to optimum braking results even in the case of changed friction properties between the friction partners of the brake system, in particular as a result of wetness, snow or ice.

A brake regulating device according to the disclosed embodiments of the type mentioned at the outset is distinguished by the fact that a limiting device is provided independently of the control unit, which limiting device limits the deceleration manipulated variable value in such a way that the deceleration manipulated variable value deviates from the target deceleration value at most by a maximum negative control excursion toward lower values or at most by a maximum positive control excursion toward higher values.

The limiting device according to the disclosed embodiments makes it possible to control the maximum positive or negative control excursion independently of the selected control behavior of the control unit. In this way, it is simultaneously possible to select optimum control parameters and to ensure that no excessively large control excursion occurs. Particularly in difficult conditions such as wetness and/or snow, optimum braking results can be achieved in this way.

According to the prior art, when a brake control circuit with a proportional controller is used there is, owing to the principle involved, also a control characteristic in which the maximum control excursions are limited. However, this behavior is restricted to the use of a pure proportional controller, which exhibits only inadequate control behavior. Moreover, an inherent limitation of the control excursion which is set in this way is inflexible since the maximum excursion in the positive and negative direction is proportional to the target deceleration value. However, this behavior does not lead to optimum braking results, especially in the case of wetness and/or snow. In an advantageous embodiment of the brake regulating device, therefore, at least one of the two maximum control excursions selected is not proportional to the target deceleration value.

In a further advantageous embodiment of the brake regulating device, the sum of the maximum negative control excursion and the maximum positive control excursion is a predetermined fixed value. In this case, the maximum negative control excursion selected can be unequal to the maximum positive control excursion. In this way, particularly in the case of smaller target deceleration values, that is to say in the case of lower braking requirements, higher braking forces are made possible, which bring about a higher energy input, by means of which a braking effect which is reduced as a result of moisture can be compensated and the brake system can be conditioned.

In a further advantageous embodiment of the brake regulating device, the positive and/or the negative maximum control excursion are time-dependent, in particular such that the excursion is lowered after a predetermined braking time. Thus, a maximum energy input into the brake can be limited and, for example, the effect of the "braking dry" of the brake can be taken into account. Provision can be made here for the maximum positive control excursion to be made time-dependent only if the target deceleration value is below a predetermined limit value. Similarly, provision can be made for the maximum negative control excursion to be made time-dependent only if the target deceleration value is above a further predetermined limit value.

In a further advantageous embodiment of the brake regulating device, at least one of the two maximum control excursions is predetermined by a characteristic curve or a characteristic map which is dependent on the target deceleration value and/or the braking time. Furthermore, at least one of the two maximum control excursions can be dependent on external influencing variables. External influencing variables can be environmental conditions (measured or determined in some other way), such as temperature or humidity or driving conditions of the rail vehicle, in particular a driving speed, a brake pressure, a braking force and/or an activation of a wheel slide protection system.

In a further advantageous embodiment of the brake regulating device, the limiting device is coupled to the control unit so as to act on parameters of the control unit as a function of a limit. In this way, a higher stability of the control circuit can be achieved when the limiting device responds. If the control unit has an integral control component, for example, then an integrated value of the difference between the actual deceleration value and the target deceleration value would continuously rise (or fall) further while the limiting device already limits the output deceleration manipulated variable value. In a subsequent changed braking situation, in which the deceleration manipulated variable value is not limited, an excessively large (or excessively small) manipulated variable value would be output by the integral control component.

A brake system according to the disclosed embodiments for a rail vehicle is distinguished by such a brake regulating device. The advantages described in conjunction with the brake regulating device are obtained.

In an operating method according to the disclosed embodiments for a brake system of a rail vehicle, a deceleration manipulated variable value is set by a control unit as a function of a target deceleration value and an actual deceleration value to minimize a deviation between the actual deceleration value and the target deceleration value. The method is distinguished by the fact that the deceleration manipulated variable value is limited in such a way that the deceleration manipulated variable value can deviate from the target deceleration value at most by a maximum negative control excursion toward lower values or at most by a maximum positive control excursion toward higher values. In this case, at least one of the two maximum control excursions may not be proportional to the target deceleration value. As a further option, at least one of the two maximum control excursions may be determined as a function of the target deceleration value and/or the braking time and/or environmental conditions and/or driving conditions.

Figure 1:
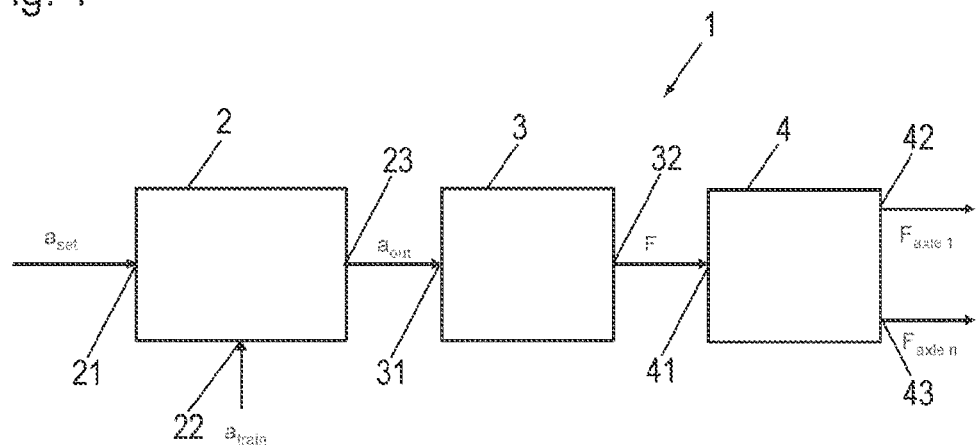
FIG. 1 shows a block diagram of a controlled system of a brake system.

FIG. 1 shows a controlled system 1 of a brake system according to the application in the form of a block diagram. The controlled system 1 comprises a brake regulating device 2, to which a target deceleration value aset is specified via an input 21. The target deceleration value aset is predetermined, for example, by a higher-level brake control system from a state of the rail vehicle. The brake regulating device 2 has a second input 22, to which an actual deceleration value atrain actually measured is fed. The measured actual deceleration value atrain can be provided, for example, by means of acceleration sensors and/or by means of a GPS (Global Positioning System).

The brake regulating device 2 furthermore has an output 23, at which a modified deceleration value is output as a deceleration manipulated variable aout. The exact functioning of the brake regulating device 2 is explained in more detail below in conjunction with FIGS. 2 and 3.

The deceleration manipulated variable aout output by the brake regulating device 2 is fed to an input 31 of a manipulated variable converter 3. The manipulated variable converter 3 determines from the deceleration manipulated variable aout a braking force F, which is output at an output 32. The braking force F is the manipulated variable for the further components of the brake system. It indicates a force to be achieved cumulatively by the brakes of the brake system and is determined from the deceleration manipulated variable aout, while, inter alia, taking into account the mass of the rail vehicle. The value for the braking force F is transmitted via an input 41 to a distributor 4, which distributes the braking force to different axles and/or different brakes and/or different types of brake of the rail vehicle and outputs axle braking forces Faxle 1 and Faxle n at corresponding outputs, here for example two outputs 42, 43, for different axles of the rail vehicle.

Without the brake regulating device 2 according to the application, the predetermined deceleration aset to be achieved could be passed directly to the input 31 of the manipulated variable converter 3. Taking into account the mass of the rail vehicle, the latter would output the braking force F in a controlled manner. In the case illustrated, the braking force F is modified in that, instead of the predefined deceleration aset to be achieved, the modified value of the deceleration manipulated variable aout is fed to the manipulated variable converter 3, which correspondingly outputs a modified value for the braking force F. In an alternative embodiment of the brake system according to the application, control could also be performed based on the braking force F, in which the braking force F is modified by a corresponding brake regulating device instead of the deceleration. However, the system presented is advantageous in that, when the regulating system acts on the target deceleration value, conversion taking into account the vehicle mass only has to take place once and not separately for a feedforward and a feedback control component.

Figure 2:
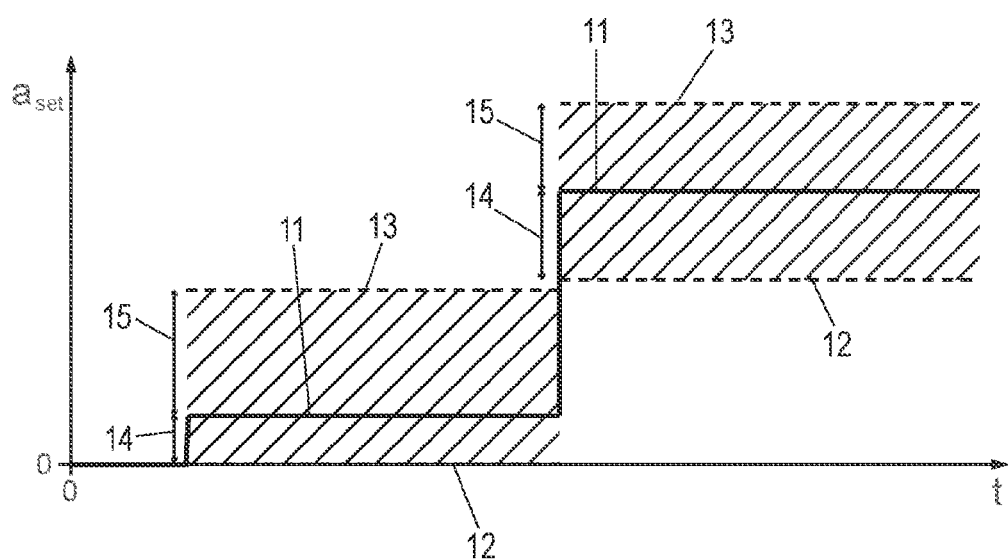
FIGS. 2-4 each show a diagram intended to illustrate the behavior of a controlled system of a brake system according to the application.

FIG. 2 shows, in the same way as FIG. 5 described at the outset, the properties of a controlled system of a brake system according to the application in a first exemplary embodiment. Curve 11 reproduces the same braking situation as in FIG. 4, in which a demanded deceleration aset is adjusted to increase from the value 0 in two stages. Once again, a lower and an upper control limit 12, 13 as well as the respectively corresponding maximum negative control excursion 14 and the maximum positive control excursion 15 are shown.

When setting the higher target value for the deceleration aset, the behavior known from the prior art is exhibited, in which the maximum positive and the maximum negative control excursion 14, 15 are equal. For the maximum deceleration value shown in the right-hand part of FIG. 2, which may be demanded, the control excursion 14, 15 selected may also be just as large as in the case of the brake system according to the prior art.

With a smaller predetermined target deceleration value aset (left-hand part of the diagram), however, the distance between the lower and upper control limits 12, 13 is just as large as with the demanded maximum value of the deceleration aset in the right-hand part of the figure. The width of the control range is thus independent of the preset target value, and is thus constant over the entire preset range. As FIG. 2 likewise shows, the division of the control range into the maximum positive control excursion 15 and the maximum negative control excursion 14 takes place at a smaller preset value, however, in such a way that there is a larger maximum positive control excursion 15. Therefore, the control range is not located centrally around the curve 11 at smaller preset target values. This control behavior takes account of the fact that, precisely when the braking process is beginning, at a relatively low deceleration value, there is a noticeable negative effect from moisture, and this can be compensated by the larger maximum positive control excursion 15.

The separation according to the application of the control unit and the limiting device enable the type of control (e.g. proportional and/or differential and/or integral control) and the control parameters used to be selected completely independently of the control limits, i.e. the maximum positive or negative control excursions 14, 15.

Figure 3:
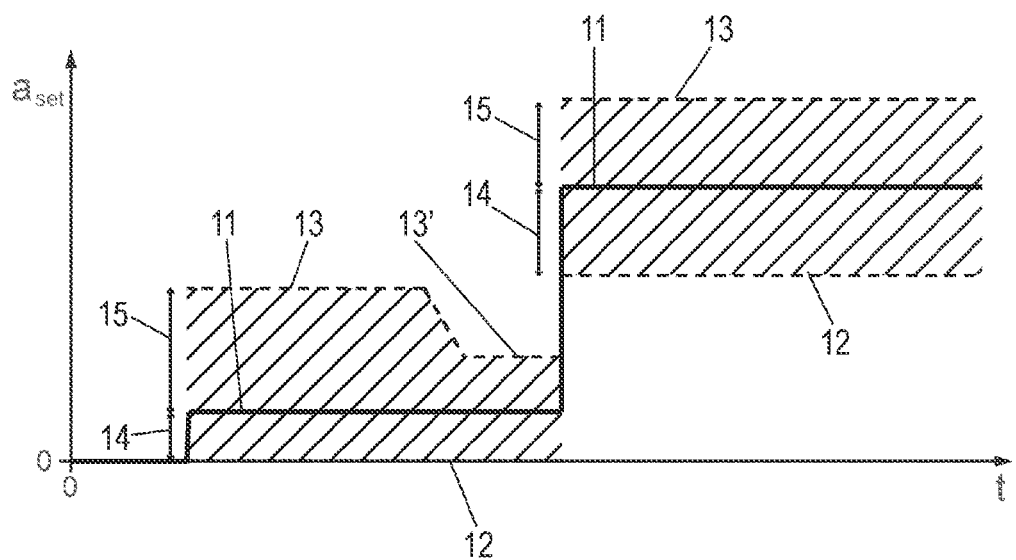

FIG. 3 shows a further exemplary embodiment of the behavior of a controlled system of a brake system according to the application. The illustration and braking situation again correspond to those shown in FIGS. 2 and 5.

In this example, the control limits are kept absolute and asymmetrical in the case of lower braking requirements (aset low), as in the example of FIG. 2. However, this takes place only for a limited period of time, with a changeover from the control limits 12, 13 shown in FIG. 2 to the control limits 12, 13 shown in FIG. 4 being made in a transition range after a certain fixedly defined time or, alternatively, a time calculated dynamically during the braking process. In particular, the initially greater maximum positive control excursion 15 is reduced to the smaller value of the maximum negative control excursion. This firstly permits advantageous braking behavior to eliminate wetness or comparable environmental influences, but then, if there is more prolonged braking, ensures a limitation of the energy input which would otherwise occur in the case of excessive braking.

Figure 4:
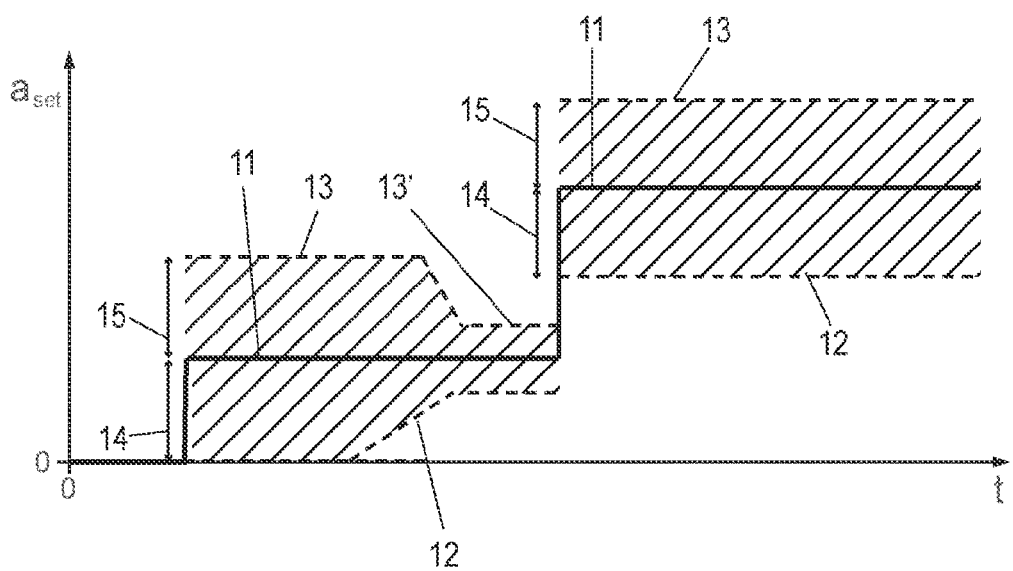

Such a time-dependent behavior of the maximum positive control excursion 15 can likewise be implemented at the maximum negative control excursion 14. This is shown in the example of FIG. 4, in which both control excursions 14, 15 are time-dependent. In this context, the time dependence itself can differ for the two control excursions 14, 15, as also shown in FIG. 4. The shape of the time dependence can also be different from the linear time dependence shown here by way of example.

In this case, FIGS. 2 to 4 show only exemplary embodiments of control limits or control excursions, and these are not strictly associated with the specified target deceleration value but are in a different functional relationship with the specified target deceleration value and/or are time-dependent.

It is self-evident that any desired functional relationship can be used with the specified target deceleration value. In this case, the functional relationship may be optimized in such a way that, with any desired deceleration and with an inadequate braking effect, the best possible conditioning effect of the friction partners, for example drying out of the moisture present, is achieved.

The functional relationship or a characteristic curve obtained therefrom can additionally also be made dependent on other influencing variables, for example on environmental conditions such as temperature and/or humidity, and/or on driving conditions such as vehicle speed, wheel speed, brake pressures or braking forces and/or activities of a wheel slide protection system. Likewise, as shown in FIGS. 3 and 4, a temporal function dependence can be introduced in order, for example, to limit the maximum energy input.

REFERENCE SIGNS

1 controlled system
11 demand curve
12, 13 control limit
14 maximum negative control excursion
15 maximum positive control excursion
2 brake regulating device
21, 22 input
23 output
3 manipulated variable converter
31 input
32 output
4 distributor
41 input
42, 43 output
$a_{set}$ target deceleration value
$a_{train}$ actual deceleration value $a_{out}$ deceleration manipulated variable
F braking force
$F_{axle\ 1}$ axle braking force
$F_{axle\ n}$ axle braking force

The invention claimed is:

1. A brake regulating device for a rail vehicle, the brake regulating device comprising:
an input for a target deceleration value;
an input for an actual deceleration value;
an output for a deceleration manipulated variable value;
a control unit that sets the deceleration manipulated variable value to minimize a deviation between the actual deceleration value and the target deceleration value; and
a limiting device which limits the deceleration manipulated variable value independently of the control unit such that the deceleration manipulated variable value deviates from the target deceleration value by setting a control range defined by at most by a maximum negative control value toward lower values and at most by a maximum positive control value toward higher values,
wherein at least one of the two maximum control values is not proportional to the target deceleration value, and wherein one of
a sum of the maximum negative control value and the maximum positive control value is a predetermined fixed value, or
wherein the positive maximum control value is time-dependent only when the target deceleration value is below a predetermined limit value, and the negative minimum control value is time-dependent only when the target deceleration value is above a further predetermined limit value.

2. The brake regulating device of claim 1, in which a sum of the maximum negative control value and the maximum positive control value is a predetermined fixed value.

3. The brake regulating device of claim 1, in which the negative maximum control value and/or the positive maximum control value are time-dependent.

4. The brake regulating device of claim 3, in which the negative maximum control value and/or the positive maximum control value are/is lowered after a predetermined braking time.

5. The brake regulating device of claim 1, in which at least one of the two maximum control values is predetermined by a characteristic curve or a characteristic map which is dependent on the target deceleration value and/or the braking time.

6. The brake regulating device of claim 1, in which at least one of the two maximum control values is dependent on external influencing variables.

7. The brake regulating device of claim 6, in which the external influencing variables are environmental conditions such as temperature or humidity.

8. The brake regulating device of claim 6, in which the external influencing variables are driving conditions of the rail vehicle, including at least one of a driving speed, a brake pressure, a braking force and/or an activation of a wheel slide protection system and/or of a sanding system and/or of a magnetic rail brake.

9. The brake regulating device of claim 1, wherein the limiting device is coupled to the control unit so as to act on parameters of the control unit as a function of a limit.

10. A brake system for a rail vehicle, the brake system comprising a brake regulating device as claimed in claim 1.

11. The brake regulating device of claim 1, wherein the maximum negative control value and the maximum positive control value correspond to control limits of a control range within which the brake regulating device can modify the demanded deceleration.

12. An operating method for a brake system of a rail vehicle, the method comprising:
setting a deceleration manipulated variable value by a control unit as a function of a target deceleration value; and
setting an actual deceleration value to minimize a deviation between the actual deceleration value and the target deceleration value,
wherein the deceleration manipulated variable value is limited independently of the control unit such that the deceleration manipulated variable value can deviate from the target deceleration value by setting a control range defined by at most by a maximum negative control value toward lower values and at most by a maximum positive control value toward higher values,
wherein at least one of the two maximum control values is not proportional to the target deceleration value, and wherein one of
a sum of the maximum negative control value and the maximum positive control value is a predetermined fixed value, or
wherein the positive maximum control value is time-dependent only when the target deceleration value is below a predetermined limit value, and the negative minimum control value is time-dependent only when the target deceleration value is above a further predetermined limit value.

13. The operating method of claim 12, in which at least one of the two maximum control values is determined as a function of the target deceleration value and/or the braking time and/or environmental conditions and/or driving conditions.

14. The operating method of claim 12, wherein the maximum negative control value and the maximum positive control value correspond to control limits of the control range.

* * * * *